United States Patent [19]

Spinosa et al.

[11] 4,328,714

[45] May 11, 1982

[54] INSTRUMENT ACTUATION ASSEMBLY

[75] Inventors: Dominic J. Spinosa, Wantagh; Frank Knoll, Huntington Station, both of N.Y.

[73] Assignee: East/West Industries, Inc., Farmingdale, N.Y.

[21] Appl. No.: 135,644

[22] Filed: Mar. 31, 1980

[51] Int. Cl.³ .................. F16C 1/10; B64D 17/62
[52] U.S. Cl. ................... 74/501 R; 244/149; 24/201 TR; 116/200
[58] Field of Search .......... 24/201 TR, 115 F, 230 R; 74/501 R; 244/149, 151 A; 9/11 A; 116/200, 212; 292/307 A

[56] References Cited

U.S. PATENT DOCUMENTS

| | | | |
|---|---|---|---|
| 1,758,795 | 5/1930 | Irvin | 244/149 |
| 2,814,336 | 11/1957 | Manhart et al. | 24/230 R |
| 2,896,885 | 7/1959 | Moy et al. | 244/149 |
| 4,083,519 | 4/1978 | Matsuo | 244/149 |

*Primary Examiner*—Kenneth Dorner

*Attorney, Agent, or Firm*—Leonard W. Suroff

[57] ABSTRACT

An actuation assembly for use in conjunction with an instrument, such as a parachute oxygen system, etc., is disclosed having a handle adapted to be manually gripped by the user of the actuation assembly and mounted relative to housing means that is fixedly secured to a strap or the like, with positionment of the handle in releasably confined position relative to the housing means until use of the actuation assembly is desired. Releasing means operatively associated with the housing means and the handle is provided to maintain the handle in the confined position relative to the housing means such that only upon the application of a predetermined force to the handle is it removable from the confined position. Coupling means for connecting the handle to the instrument to be actuated is provided such that upon removal of the handle from the confined position a force is applied through the coupling means to the instrument for actuation of the system associated therewith.

16 Claims, 6 Drawing Figures

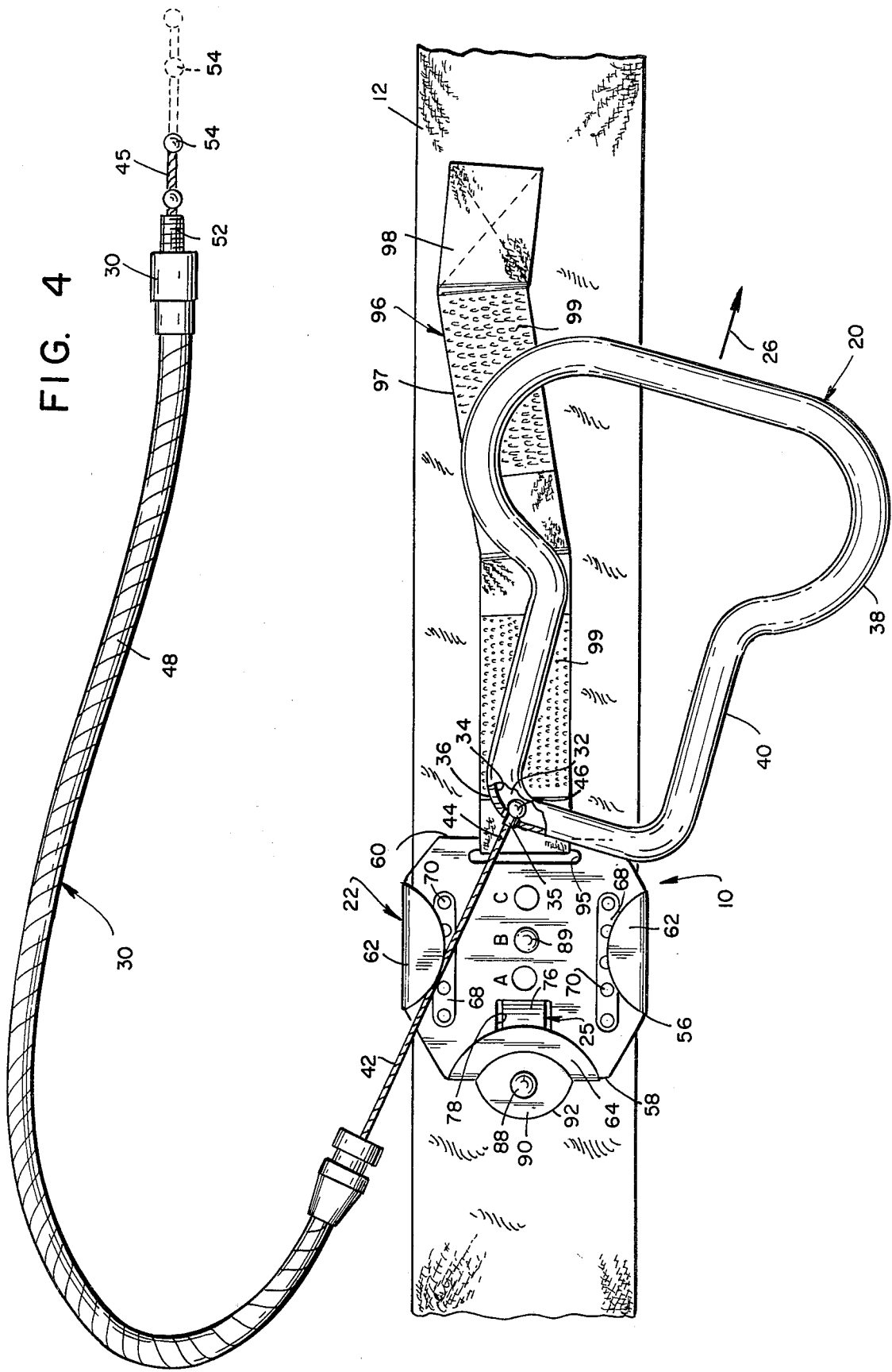

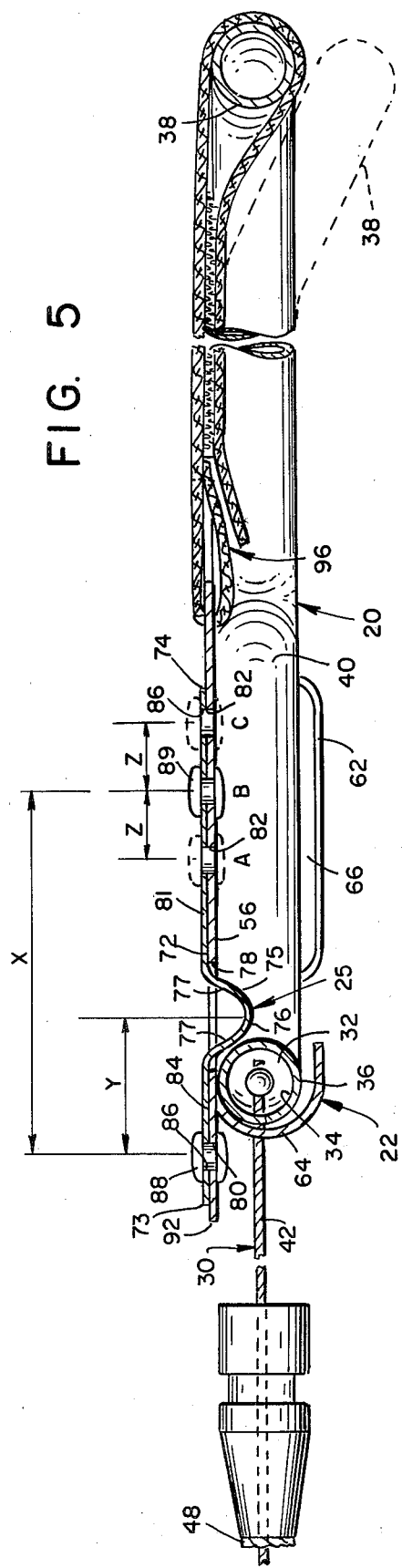

INSTRUMENT ACTUATION ASSEMBLY

BACKGROUND OF THE INVENTION

The invention relates generally to an actuation assembly for use generally with survival units of various types, such as those contained in aircraft, to activate a parachute, raft, oxygen supply, etc.

The activation of various equipment in an aircraft from time to time may be required and the present invention permits this process to be accomplished in a safe reliable manner. There are many instances where activation of safety devices are required for military and civil uses and the assembly remains inactive for prolonged periods of time but must be easily used when the emergency arises. It has now been discovered, that by the use of the actuation assembly of the present invention, that a safe and efficient operation of the instrument or unit to which it is connected may readily take place.

OBJECTS OF THE INVENTION

An object of the present invention is to provide an actuation assembly or system that is easy to use and requires a predetermined force to initially deploy the handle therefrom.

Another object of the present invention is to provide an actuation device that is readily secured to a harness or the like for ready use by the person wearing the harness.

Another object is to provide an actuation assembly where the force required to deploy the handle may be adjusted.

Other objects and advantages of the present invention will be obvious as the disclosure proceeds.

SUMMARY OF THE INVENTION

The present invention provides an actuation system for the use in conjunction with an instrument to be actuated. The instrument may be one of a variety as used in life support systems such as parachutes, life rafts, oxygen systems, etc. or other instruments of various types. A handle adapted to be manually gripped by the user of the actuation system is provided in conjunction with housing means adapted to be fixedly secured to a harness or the like and to permit positionment of the handle in releasably confined position relative to the housing means until use of the actuation system is desired.

Releasing means is operatively associated with the housing means and the handle so as to maintain the handle in the confined position relative to the housing means such that only upon the application of a predetermined force to the handle is it removable from the confined position thereof. Coupling means connecting the handle to the instrument to be actuated is provided such that upon removal of the handle from the confined position relative to the housing means a force is applied through the coupling means to the instrument.

The handle includes a chamber extending therein and an opening to the exterior of the handle at one end of the chamber. The coupling means includes a cable having a pair of spaced apart ends with a head fixedly secured to the cable at one end thereof. The head is adapted to extend within the chamber and having a cross-section preventing removal through the opening, such that a force applied to the handle is transmitted to the cable when the head abuts against the opening. The coupling means may include a sheath surrounding the cable and adapted to be secured to the instrument at one end thereof. The cable extends into the chamber a sufficient distance to permit removal of the handle from the confined position prior to the head abutting the opening so as to permit the user to firstly overcome the force required to remove the handle from the confined position and secondly to apply a force through the coupling means necessary for the instrument to be actuated.

The releasing means includes a clip having a pair of spaced apart ends coupled to the housing means and a projection intermediate the ends. The projection extends in the path through which the handle is to travel when removing same from the confined position, such that resilient deflection of the projection is obtained when a minimum predetermined force is applied to the handle in a given direction. In accordance with the invention the releasing means is adjustable to provide selection of the range of the force necessary to remove the handle from the confined position. This force is selected when the actuation system is initially assembled. The force may be adjusted to be in the range of ten to thirty pounds.

The housing includes a base having a front end and spaced apart rear end with a pair of side arms extending intermediate the ends and joined to the base. The arms extending upwardly from the base and laterally spaced apart a distance adapted to receive a portion of the handle therebetween. A front arm formed at the front end of the base is also provided to further confine the handle in place. In addition an aperture extends through the base, and the protrusion extends through the base on the same side of the base as the arms. The handle may have a circular shape and the arms have an arcuate configuration to accept the shape. The handle has a front end adapted to be received within the arms and a rear end extending beyond the housing. The handle may take various shapes and configurations. Depending upon the application of the system the rear end of the handle may be inclined relative to the front end thereof.

The base may include a slot extending adjacent to the front end thereof, and one hole extending on one side of the slot and two or more holes extending on the opposite side of the slot. The clip includes a pair of flanges, each one of the flanges joined to the projection on opposite sides thereof and terminating at the spaced apart ends. Holes extend along the flanges coinciding with the holes in the base. Fasteners are used for joining the flanges to the base through the holes. The fasteners may be in the form of rivets. The force necessary to obtain the resilient deflection of the projection is adjustable by varying the positionment of one of the fasteners relative to the projection.

Safety means is operatively associated with the housing means and the handle to provide security against inadvertent removal of the handle from the confined position. The safety means includes a strap coupled to the housing means and adapted to extend around the handle for retaining same in place. The strap being readily released when the instrument is to be actuated. The strap includes a pull tab to facilitate release thereof. Identification means may also be associated with the strap so as to provide visual determination such that the desired instrument is actuated. The identification means may be distinguishable by color.

BRIEF DESCRIPTIONS OF THE DRAWINGS

Although the characteristic features of this invention will be particularly pointed out in the claims, the invention itself, and the manner in which it may be made and used, may be better understood by referring to the following description taken in connection with the accompanying drawings forming a part thereof, wherein like reference numerals refer to like parts throughout the several views and in which:

FIG. 4 is an enlarged view similar to FIG. 3 showing the deployment of the actuation assembly by removal of the handle from the housing means;

FIG. 5 is a cross-sectional view of the handle in seated position relative to the housing means prior to the deployment of the handle therefrom; and FIG. 6 is a view similar to FIG. 5 illustrating the deflection of the releasing means during deployment of the handle.

DETAILED DESCRIPTION OF THE DRAWINGS

Hereinafter, in this specification, the term "belt" will be used to indicate generally a belt, harness, webbing, strap or any other elongated part or parts to which the actuation assembly will be applied for gripping when required. Such belt may be a strap worn by an aviator and requiring quick release or adjustment or other release purposes, or an ordinary belt, or a trunk strap, or any other elongated member to which the actuation assembly of the present invention maybe coupled.

Figure 1:
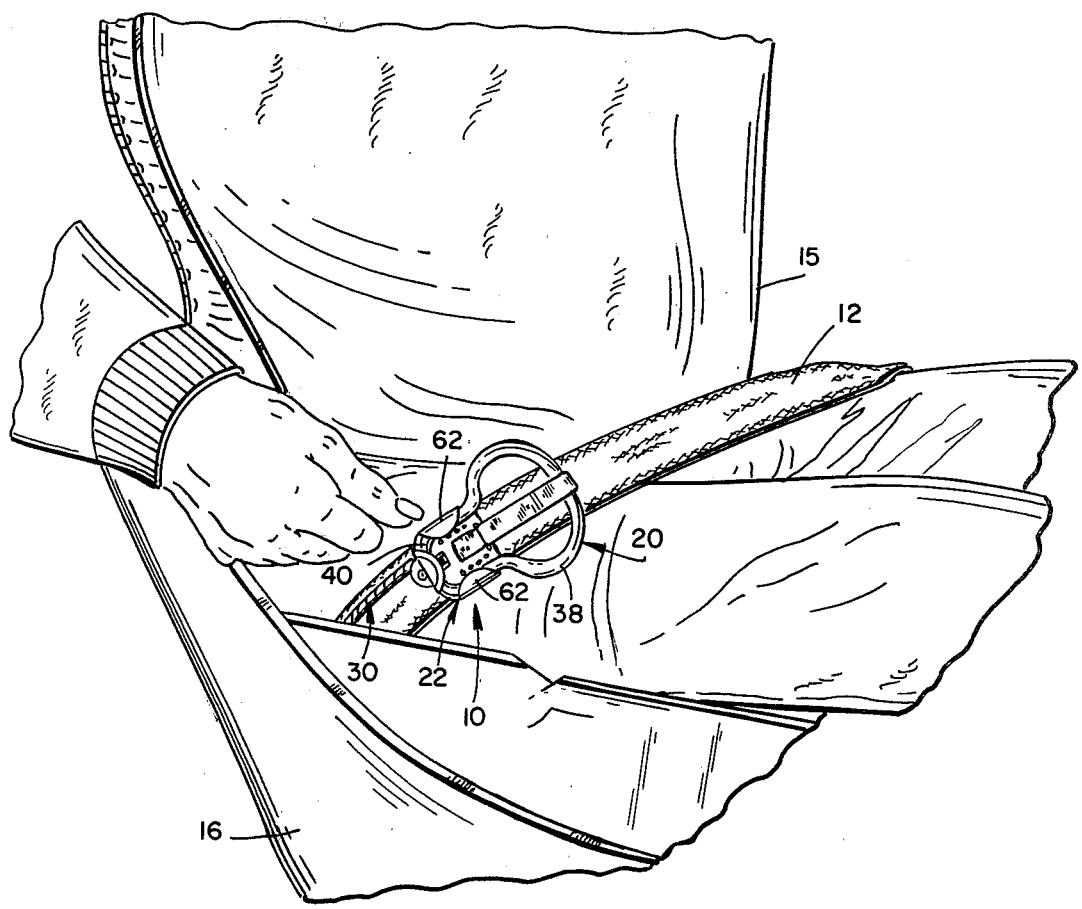
FIG. 1 is a perspective view of an individual having an actuation assembly of the present invention mounted relative thereto.

Referring to the drawings in detail, and initially to FIG. 1 thereof, it will be seen that the actuation assembly 10 is mounted on a seat belt or harness generally indicated at 12, which is adapted to retain an individual at 15, in a seated fixed position relative to a seat unit 16. The seat belt at 12 may include coupling means (not shown) at one or both ends thereof for connecting an elongated safety seat belt in a manner to form a restraining system for the individual 15 with respect to the seat unit 16.

Figure 2:
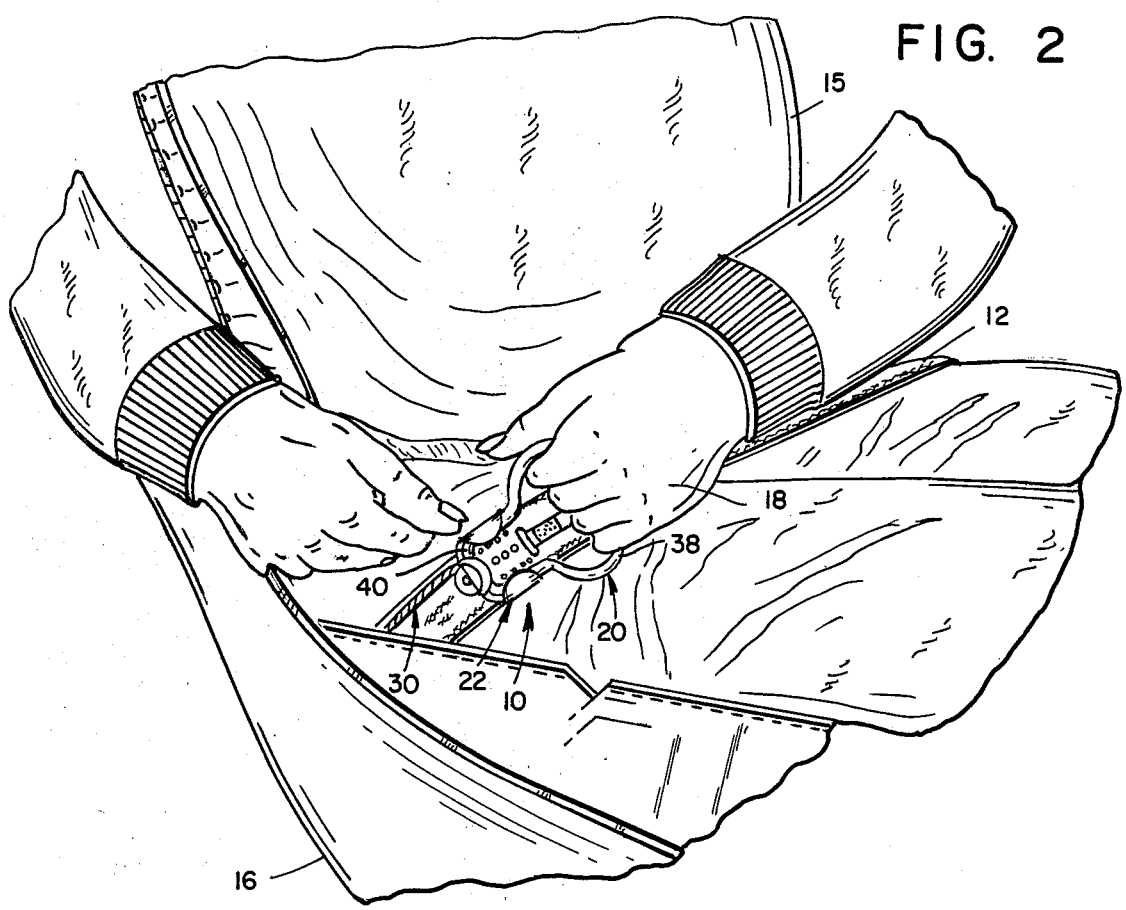
FIG. 2 is a perspective view similar to FIG. 1 illustrating the manner in which the individual engages the actuation assembly prior to removal of the handle therefrom.

The actuation assembly or system 10 is for use in conjunction with an instrument (not shown) to be actuated when desired by the individual 15 by use of one of the persons hands 18 as illustrated in FIG. 2. The instrument coupled to the actuation assembly 10 may be one of a variety as used in life support systems such as parachutes, life rafts, oxygen systems, etc. or other instruments of various types in which remote actuation is desired. A handle 20 adapted to be manually gripped by the user 15 of the actuation assembly 10 is provided in conjunction with housing means 22 adapted to be fixedly secured to the harness 12 or the like and to permit positionment of the handle 20 in releasably confined position relative to the housing means 22 until use of the actuation assembly 10 is desired.

Releasing means 25 is operatively associated with the housing means 22 and the handle 20 so as to maintain the handle 20 in the confined position relative to the housing means 22 such that only upon the application of a predetermined force to the handle 20 in the direction of arrow 26 as illustrated in FIG. 4 is it removable from the confined position thereof. Coupling means 30 connecting the handle 20 to the instrument to be actuated is provided such that upon removal of the handle 20 from the confined position relative to the housing means 22 a force is applied through the coupling means 30 to the instrument to actuate same.

The handle 20 includes a chamber 32 extending therein with an interior or inner surface 34 and an opening 35 to the exterior or outer surface 36 of the handle 20 at one end or along the chamber 32. The handle 20 may be fabricated from a metallic material and may be tubular such that the chamber 32 extends completely therethrough. The handle 20 may have a rear or gripping section 38 which may have an enlarged configuration adapted to be readily gripped by the hand 18 as illustrated in FIG. 2, and a front section 40. The front section 40 is adapted to be releasably retained in the housing means 22 by the releasing means 25.

The front section 40 and rear section 38 may be in a common horizontal plane or the rear section 38 may be inclined or at an angle relative to the front section 40.

The coupling means 30 includes a cable 42 having a pair of spaced apart ends 44 and 45 as illustrated in FIG. 4. A ball or head 46 is fixedly secured to the cable 42 at the end 44 thereof. The head 46 is adapted to extend within the chamber 32 and having a cross-section preventing removal through the opening 35, such that a force applied to the handle 20 is transmitted to the cable 42 when the head 46 abuts against the interior surface 34 of the opening 35. The coupling means 30 may include an enclosure or sheath 48 surrounding the cable 42 and adapted to be secured to the instrument at the end 45 thereof. An adaptor 50 having a threaded portion 52 thereon may be at one end of the sheath 48. The threaded portion 52 maybe secured to the instrument in a conventional manner. An enlarged portion 54 may be formed or connected to the end 45 of the cable 42 to prevent movement into the sheath 48. The cable 42 extends into the chamber 32 a sufficient distance to permit removal of the handle 20 from the confined position prior to the head 46 abutting the opening 35 so as to permit the user to firstly overcome the force required to remove the handle 20 from the confined position and overcome the releasing means 25 and secondly to apply a force through the coupling means 30 necessary for the instrument to be actuated.

Figure 3:
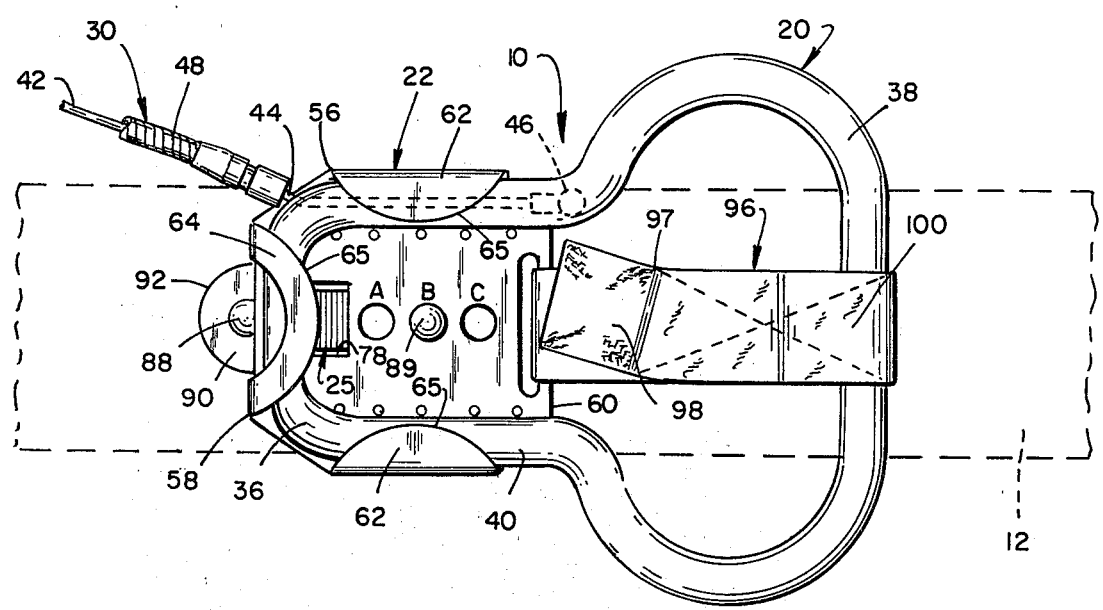
FIG. 3 is a top plan view of the actuation assembly embodying the present invention in the assembled portion thereof.

The housing means 22 includes a base 56 having a front end 58 and spaced apart rear end 60 with a pair of side arms 62 extending intermediate the ends and joined to the base 56. The arms 62 extending upwardly from the base 56 and laterally spaced apart a distance are adapted to receive the front section or portion 40 of the handle 20 therebetween. A front arm 64 formed at the front end 58 of the base 56 is also provided. The arms 62 and 64 have a terminal edge 65 that may be contoured and an inner face 66 that may be contoured in substantially matching conformity to the outer surface 36 of the front end 40 of the handle 20. In this way the handle 20 is received in telescopic relation to the arms 62 and 64 during the inactive or assembled relationship of the actuation assembly 10 as illustrated in FIGS. 1, 2 and 3 for example. Obviously the size and shape of the arms 62 and 64 may vary in shape and size provided they maintain the handle 20 in a confined manner as required.

A slight clearance is generally provided between the inner face 66 and the outer surface 36.

The housing means 22 may be joined to the belt 12 in various ways. For example a plurality of holes may be provided along the base 56 and depression 68 is provided to receive the heads of fasteners 70 that extend through the belt 12 to fix the housing means 22 thereto.

The releasing means 25 includes a clip 72 having a pair of spaced apart ends 73 and 74 coupled to the housing means 22 and a projection 75 intermediate the ends 73 and 74. The projection 75 extends in the path through which the handle 20 is to travel as illustrated in FIG. 5, when removing same from the confined position, such that resilient deflection of the projection 75 is obtained as illustrated in FIG. 6, when a minimum predetermined force is applied to the handle to a given direction. The projection 75 has a tip 76 that is adapted to abut against the outer surface 36 as illustrated in FIG. 6. The clip 72 is fabricated from a metallic or plastic material and can be deflected as hereinafter explained. In addition an aperture or slot 78 extends through the base 56, and the protrusion 75 extends through the base 58 on the same side of the base 58 as the arms 62 and 64. The handle 20 may have a circular shape and the arms 62 and 64 at the inner face 66 may have an arcuate configuration to accept the shape. The front end 40 of the handle 20 is adapted to be received within the arms 62 and 64 with the rear end 38 extending beyond the housing means 22. The handle 22 may take various shapes and configurations. Depending upon the application of the system the rear end 38 of the handle 20 may be inclined relative to the front end 40 thereof, as illustrated in FIG. 5. The projection 75 includes a pair of lips 77 that merge at the tip 76, which may be rounded.

In accordance with the invention the releasing means 25 is adjustable to provide selection of the range of the force necessary to remove the handle 20 from the confined position. This force is selected when the actuation system 10 is initially assembled. The force may be adjusted to be in the range of ten to thirty pounds.

The base 56 may include the slot 78 extending adjacent to the front end 58 thereof, and one hole 80 extending on one side of the slot 78 and two or more holes 82 extending on the opposite side of the slot 78. The clip 72 includes a pair of flanges 84 and 85. Each one of the flanges 84 and 85 is joined to the projection 75 on opposite sides thereof and terminating at the spaced apart ends 73 and 74, respectively. Holes 86 extend along the flanges 84 and 85 coinciding with the holes 80 and 82 in the base 56. Fasteners 88 and 89 are used for joining the flanges 84 and 85 to the base 56 through the holes 86. The fasteners 88 and 89 may be in the form of rivets. The force necessary to obtain the resilient deflection of the projection 75 is adjustable by varying the positionment of one of the fastener 89 relative to the projection 75 as illustrated in FIG. 5. The clip 72 may be of various thickness to obtain the desired deflection. Accordingly the lips 77 may flex as the handle engages the tip 76.

The clip 72 is secured to the base 56, which may have an enlarged region 90 having a rear end 92. The force applied in the direction of arrow 26 in order to deflect the projection 75 from the position illustrated in FIG. 5 to that illustrated in FIG. 6 is dependent upon the free distance between the first fixed end of the clip 72 at fastener or rivet 88 and fastener or rivet 89.

The location of rivet 89 may be at location A, B or C as indicated on FIGS. 3 and 4. The distance between the opening for rivet 88 and opening B is the dimension X. The distance between opening A to B, and B to C is the distance represented by the dimension Z as illustrated in FIG. 5. These dimensions between the respective openings need not be of equal distance. The force as indicated by arrow 26 can be changed by selecting that the rivet 89 is utilized either in holes indicated at A, B, or C. The reason for this is that the flexure of the clip 72 at the tip 76 is based upon the dimension X which is a function of the holes indicated at A, B or C. The dimension X is varied by the distance Z. The dimension Y represents the distance from the tip 76 to the center of rivet 88.

Although Y is a fixed dimension, the dimension X accounts for the variation in the force to depress or deflect the projection 75 from the position of FIG. 5 to that illustrated in FIG. 6. For example in accordance with one group of selected dimensions with the rivet 89 in position A a force of 27 pounds is required, in position B a force of 23 pounds is required and in position C a force of 19 pounds is required. Accordingly in the assembly of the unit, depending upon its proposed usage the desired position of rivet 89 is selected.

Safety means 96 is operatively associated with the housing means 22 and the handle 20 to provide security against inadvertent removal of the handle 20 from the confined position. The safety means 96 includes a strap 97 coupled to the housing means 22 and adapted to extend around the handle 20 for retaining same in place. The strap 97 being readily released when the instrument is to be actuated. The strap 97 includes a pull tab 98 to facilitate release thereof. The strap 97 extends through an aperture 95 that extends adjacent to the rear end 60 of the base 56. The strap 97 may include a facing 99 fabricated from plastic that releasably adheres to each other when placed in the position of FIG. 3. The tab 98 when pulled will disconnect the facing 99 and the open position of the safety means 96 will be reached as illustrated in FIG. 4. The handle 20 may then be pulled free from the housing means 22.

Identification means 100 may also be associated with the strap 97 so as to provide visual determination such that the desired instrument is actuated. The identification means 100 may be distinguishable by color. For example green is for an oxygen system, yellow for a life raft system, grey for a $CO_2$ system.

Although an illustrative embodiment of the invention has been described in detail herein with reference to the accompanying drawings, it is to be understood that the invention is not limited to the precise embodiment, and that various changes and modifications may be effected therein without departing from the scope or spirit of the invention.

We claim:

1. An actuation assembly for use in conjunction with an instrument to be actuated, comprising:
   A. a handle adapted to be manually gripped by the user of the actuation assembly,
   B. housing means adapted to be fixedly secured to a harness or the like and for positioning said handle in a releasably confined position relative to said housing means until use of the actuation assembly is desired,
   C. releasing means operatively associated with said housing means so as to maintain said handle in said confined position relative to said housing means so as to obtain upon the application of a predetermined force resilient deflection of said releasing means such that said handle is removable from said confined position, said releasing means being adjustable to provide stepped indexed selection of a force within the range of possible forces necessary to remove said handle from said releasably confined position, D. coupling means connecting said handle to the instrument to be actuated, such that upon removal of said handle from said confined position beyond said releasing means a force is applied through said coupling means to actuate the instrument, E. said releasing means includes:
  (1) a clip having a pair of spaced apart ends coupled to said housing means and a projection intermediate said ends,
  (2) said projection extending in the path through which said handle is to travel when removing same from said confined position, such that resilient deflection of said projection is obtained when a minimum predetermined force is applied to said handle in a given direction, F. said housing includes:
  (1) a base having a front end and spaced apart rear end,
  (2) a pair of side arms intermediate said ends and joined to said base, said arms extending upwardly from said base and laterally spaced apart a distance adapted to receive a portion of the handle therebetween,
  (3) a front arm formed at said front end of said base,
  (4) a slot extending through said base, and
  (5) said projection extending through said slot disposed through said base on the same side of said base as said arms, and G. said base includes one hole extending on one side of said slot and two or more holes extending on the opposite side of said slot.

2. An actuation assembly as defined in claim 1, wherein said handle includes a chamber extending therein and an opening to the exterior of said handle from said chamber.

3. An actuation assembly as defined in claim 2, wherein said coupling means includes:
  a. a cable having a pair of spaced apart ends, and
  b. a head fixedly secured to said cable at one end thereof, said head adapted to extend within said chamber and having a cross-section preventing removal through said opening, such that a force applied to said handle is transmitted to said cable when said head abuts against said opening.

4. An actuation assembly as defined in claim 2, wherein said coupling means includes a sheath surrounding said cable and adapted to be secured to the instrument at one end thereof.

5. An actuation assembly as defined in claim 2, wherein said cable extends into said chamber a sufficient distance to permit removal of said handle from said confined position prior to said head abutting said opening so as to permit the user to firstly overcome the force required to remove said handle from said confined position and secondly to apply a force through said coupling means necessary for the instrument to be actuated.

6. An actuation assembly as defined in claim 1, wherein said force is in the range of ten to thirty pounds.

7. An actuation assembly as defined in claim 1, wherein said handle has a circular cross section and said arms have an arcuate configuration to accept said circular cross section.

8. An actuation assembly as defined in claim 7, wherein said handle has a front end adapted to be received within said arms and a rear end extending beyond said housing means.

9. An actuation assembly as defined in claim 8, wherein said rear end of said handle is inclined relative to said front end.

10. An actuation assembly as defined in claim 1, wherein said clip includes:
  a. a pair of flanges, each one of said flanges joined to said protrusion on opposite sides thereof and terminating at said spaced apart ends,
  b. holes along said flanges coinciding with said holes in said base, and
  c. fasteners joining said flanges to said base through said holes with one fastener in each one of said flanges.

11. An actuation assembly as defined in claim 10, wherein the force necessary to obtain said resilient deflection of said projection is adjustable by varying the positionment of one of said fasteners relative to said projection.

12. An actuation assembly as defined in claim 1, and further including safety means operatively associated with said housing means and said handle to provide security against inadvertent removal of said handle from said confined position.

13. An actuation assembly as defined in claim 12, wherein said safety means includes a strap coupled to said housing means and adapted to extend around said handle for retaining same in place, said strap being readily released when the instrument is to be actuated.

14. An actuation assembly as defined in claim 12, said strap including a pull tab to facilitate release thereof.

15. An actuation assembly as defined in claim 12, and further including identification means associated with said strap so as to provide visual determination such that the desired instrument is actuated.

16. An actuation assembly as defined in claim 15, wherein said identification means is distinguishable by color.

* * * * *